US012705365B2

(12) United States Patent
Schneider et al.

(10) Patent No.: US 12,705,365 B2
(45) Date of Patent: Aug. 11, 2026

(54) METHOD AND PROGRAM PRODUCT FOR IDENTIFYING BEHAVIORAL ANOMALIES AND RISK FACTORS IN SOFTWARE DEVELOPMENT

(71) Applicants: Kenneth Schneider, San Francisco, CA (US); Raj Mallempati, San Jose, CA (US); David Sarkisyan, Yerevan (AM)

(72) Inventors: Kenneth Schneider, San Francisco, CA (US); Raj Mallempati, San Jose, CA (US); David Sarkisyan, Yerevan (AM)

(73) Assignee: BlueFlag Security Inc., Sunnyvale, CA (US)

( * ) Notice: Subject to any disclaimer, the term of this patent is extended or adjusted under 35 U.S.C. 154(b) by 36 days.

(21) Appl. No.: 18/907,138

(22) Filed: Oct. 4, 2024

(65) Prior Publication Data

US 2025/0117492 A1 Apr. 10, 2025

Related U.S. Application Data

(60) Provisional application No. 63/587,982, filed on Oct. 4, 2023.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC ......................... G06F 21/577; G06F 2221/033
See application file for complete search history.

(56) References Cited

U.S. PATENT DOCUMENTS

2021/0273957 A1* 9/2021 Boyer .................... G06F 21/554
2022/0114594 A1* 4/2022 Nunes ................ G06Q 20/4016
2023/0009127 A1 1/2023 Boyer

OTHER PUBLICATIONS

International Search Report and Written Opinion issued in Application No. PCT/US2024/050068, mailed Dec. 6, 2024.

* cited by examiner

*Primary Examiner* — Shirley X Zhang
(74) *Attorney, Agent, or Firm* — Amster, Rothstein & Ebenstein LLP

(57) ABSTRACT

A method and computer-implemented process for identifying behavioral anomalies and risk factors is disclosed. The method includes (A) obtaining, by a risk assessment module, first data associated with activity information of a digital identity with respect to a digital development tool; (B) associating, by the risk assessment module, second data with a first risk tag based on a risk-anomaly matrix; (C) generating, by the risk assessment module, a first predicted anomaly using a machine learning module trained using a first training set, wherein the first training set comprises the second data and the first risk tag; (D) associating, by the risk assessment module, the first predicted anomaly with a second risk tag based on the risk-anomaly matrix; and, (E) transmitting, by the risk assessment module, a notification associated with at least one of (i) the anomaly and (ii) the predicted anomaly, and the digital identity.

5 Claims, 3 Drawing Sheets

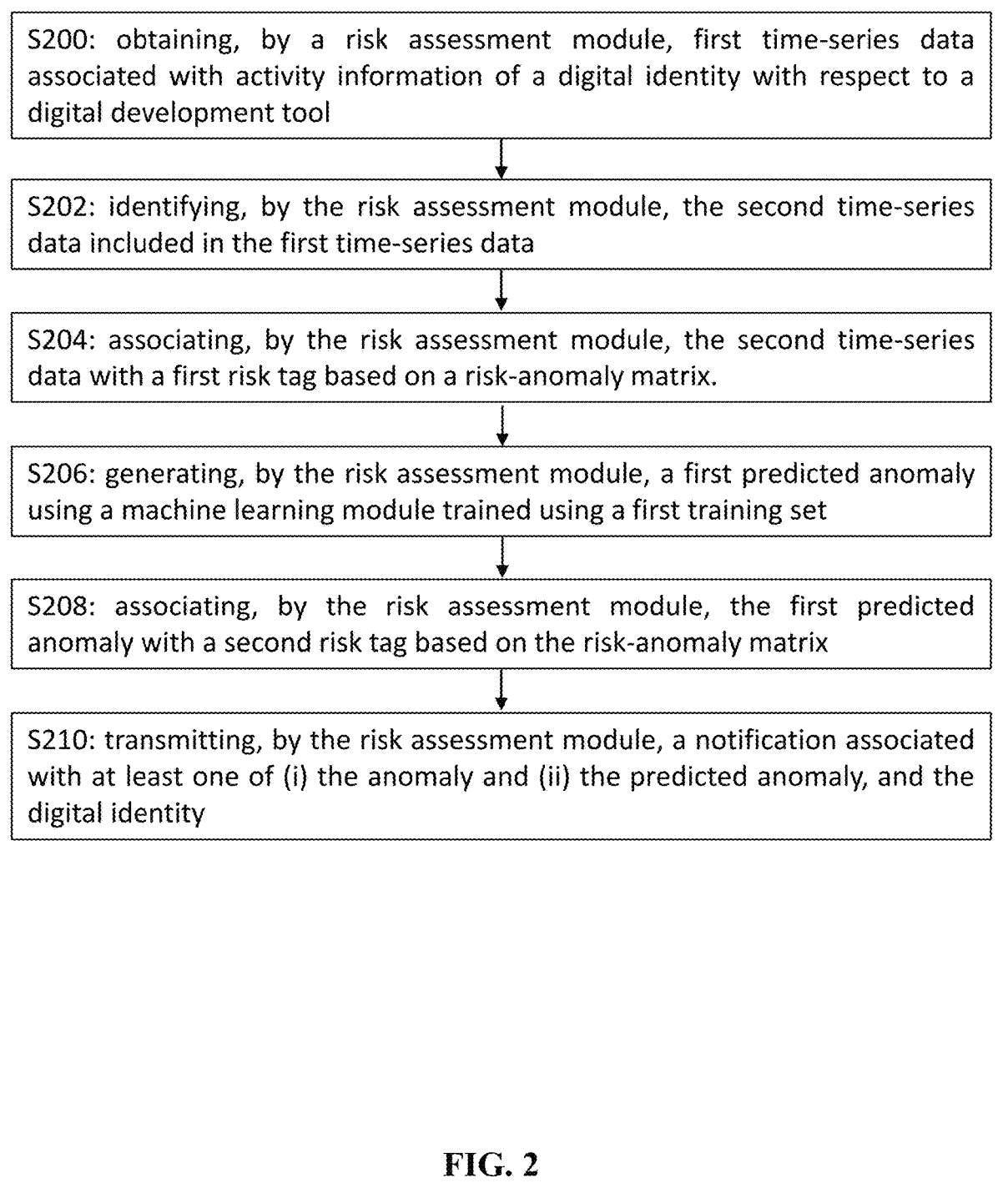

S200: obtaining, by a risk assessment module, first time-series data associated with activity information of a digital identity with respect to a digital development tool S202: identifying, by the risk assessment module, the second time-series data included in the first time-series data S204: associating, by the risk assessment module, the second time-series data with a first risk tag based on a risk-anomaly matrix.

S206: generating, by the risk assessment module, a first predicted anomaly using a machine learning module trained using a first training set S208: associating, by the risk assessment module, the first predicted anomaly with a second risk tag based on the risk-anomaly matrix S210: transmitting, by the risk assessment module, a notification associated with at least one of (i) the anomaly and (ii) the predicted anomaly, and the digital identity

FIG. 2

METHOD AND PROGRAM PRODUCT FOR IDENTIFYING BEHAVIORAL ANOMALIES AND RISK FACTORS IN SOFTWARE DEVELOPMENT

CROSS-REFERENCE TO RELATED APPLICATIONS

This application claims priority to and the benefit of U.S. Provisional Patent Application No. 63/587,982, filed Oct. 4, 2023, and entitled METHOD AND PROGRAM PRODUCT FOR IDENTIFYING BEHAVIORAL ANOMALIES AND RISK FACTORS IN SOFTWARE DEVELOPMENT, the contents of which are incorporated herein by reference in their entirety.

FIELD OF THE INVENTION

The present invention generally relates to security in software development.

BACKGROUND OF THE INVENTION

At present, the software development pipeline may be incredibly complex. A single developer (e.g., a person who develops software programs or applications) may have a digital presence including multiple digital identities expanding across various stages of the development pipeline. For example, developers may have access to and utilize source code repositories (e.g., Git, Azure DevOps, BitBucket, Gitlab, and Github), service management tools (e.g., Fresh Service, Zendesk, ServiceNow, Slack and Jira), Identity and Access Management tools (e.g., Oracle, ForgeRock, One Login, Ping Identity, Microsoft Entra, also known as Azure AD, and Okta) and a variety of other tools in the digital development pipeline.

This expansive software development pipeline, while offering benefits, poses many security risks. Across organizations, individuals, groups, and roles may be given greater access to development tools than is needed, creating a vulnerability for bad actors to exploit and enhancing the potential damage a bad actor is able to cause should they gain access to a user's digital presence. Access to development tools may be granted to external entities or may never expire, even when a developer or other user no longer needs access to the tool. Additionally, open-source code (e.g., as used on GitHub) is frequently used by developers but may contain malicious external code or undetected inherent vulnerabilities. At the same time, there may be little to no oversight of the permissions and activities of a developer across the developer's digital presence in the software development pipeline. In some cases, administrators may not even be aware of the vulnerabilities, particularly on an individual level.

As a result, software development pipelines are subject to particular threats. Risky and unusual developer behavior (for example, either as a result of an external bad actor or intentionally by the developer) may go undetected, resulting in significant amounts of code leakage security policy violations. Risky configurations, such as self-approved merges and disabled branch detection, may likewise go undetected and unmediated, threatening destruction of code and information.

To date, attempts to overcome these challenges, including software applications such as RevealSecurity, Apiiro, and Veza, have been limited in scope to specific development environments, individual users, and specific security issues. For example, while RevealSecurity attempts to monitor certain anomalous activity of individual users, it does not determine whether user activity is anomalous in view of other similarly situated users or other users in an organization (e.g., the user's peers). Meanwhile, Apiiro only analyzes code committed to a source repository for risky and/or material changes, and Veza only traces permission configurations within an organization. Each of these software applications are thus limited to certain development applications and only provide isolated insight into associated development risks. This leaves system administrators blind to significant types of risk in their organizations, including composite risks arising from the confluence of many factors.

The present solutions represent siloed approaches which do not take a comprehensive look at associated development risks. As such, there is currently in the art no way to holistically assess risk in particular development pipelines or anomalous behaviors of developers. The present solutions in the art are also limited in that they do not forecast risk, limiting the ability of administrators to proactively take steps to prevent risky behavior.

What is needed is a solution to these and other problems associated with software development systems which create risk adverse development pipeline environments.

SUMMARY OF THE INVENTION

In view of the above, it is an object of the present disclosure to provide a technological solution to address the long felt need and technological challenges faced in conventional software development systems in identifying and mediating risky developer behavior. In embodiments, the present disclosure relates to systems, methods, and program products that overcome this technical problem by utilizing a novel system and method for detecting, identifying, predicting, and remediating anomalous behaviors exhibited by developers In embodiments, such methods and systems may use generative algorithms and reinforcements to generate new combinations of risk and attack vectors not currently known or published, and may detect anomalous behavior across development spaces and developers.

In exemplary embodiments, a method for identifying behavioral anomalies and risk factors is disclosed. The method includes obtaining, by a risk assessment module, first time-series data associated with activity information of a digital identity with respect to a digital development tool, identifying, by the risk assessment module, second time-series data included in the first time-series data, wherein the second time-series data is associated with an anomaly of the first time-series data, associating, by the risk assessment module, the second time-series data with a first risk tag based on a risk-anomaly matrix, generating, by the risk assessment module, a first predicted anomaly based on the second time-series data and the first risk tag, using a machine learning module trained using a first training set, wherein the first training set comprises the second time-series data and the first risk tag, associating, by the risk assessment module, the first predicted anomaly with a second risk tag based on the risk-anomaly matrix, and, transmitting, by the risk assessment module, a notification associated with at least one of (i) the anomaly and (ii) the predicted anomaly, and (iii) the digital identity.

In embodiments, the risk-anomaly matrix is generated based on attack policies and defense policies stored in a risk-anomaly library, wherein a plurality of the attack policies and defense policies are generated by a reinforcement learning module comprising an attacking agent and a defending agent by the steps comprising, for each scenario of a plurality of scenario, by the steps of: generating, by the attacking agent, an attack policy for an environment of the scenario, generating, by the defending agent, a defense policy for the environment, updating the state of the environment based on the attack policy and the defense policy, providing a first reward to the attacking agent and a second reward to the defending agent based on the state of the environment, modifying the attack policy based on the first reward, modifying the defense policy based on the second reward, iteratively repeating steps (A-F) for a plurality of states of the scenario, and storing the highest scoring attack policy and the highest scoring defense policy in the risk-anomaly library.

In further exemplary embodiments, a method for identifying behavioral anomalies and risk factors is disclosed. The method includes obtaining, by a risk assessment module, first data associated with activity information of a digital identity with respect to a digital development tool, associating, by the risk assessment module, second data with a first risk tag based on a risk-anomaly matrix, generating, by the risk assessment module, a first predicted anomaly using a machine learning module trained using a first training set, wherein the first training set comprises the second data and the first risk tag, associating, by the risk assessment module, the first predicted anomaly with a second risk tag based on the risk-anomaly matrix, and transmitting, by the risk assessment module, a notification associated with at least one of (i) the anomaly and (ii) the predicted anomaly, and the digital identity.

In embodiments, the first data and the second data are time-series data.

Other features and advantages of the present disclosure will become readily apparent from the following detailed description and the accompanying drawings.

BRIEF DESCRIPTION OF THE DRAWINGS

The above and related objects, features and advantages of the present disclosure will be more fully understood by reference to the following detailed description of the preferred, albeit illustrative, embodiments of the present invention when taken in conjunction with the accompany figures, wherein:

FIG. 2 depicts an exemplary flowchart of embodiments of the present disclosure.

DETAILED DESCRIPTION OF THE INVENTION

The present disclosure generally relates to a method and computer-implemented process and system for identifying behavioral anomalies and risk factors.

Figure 1:
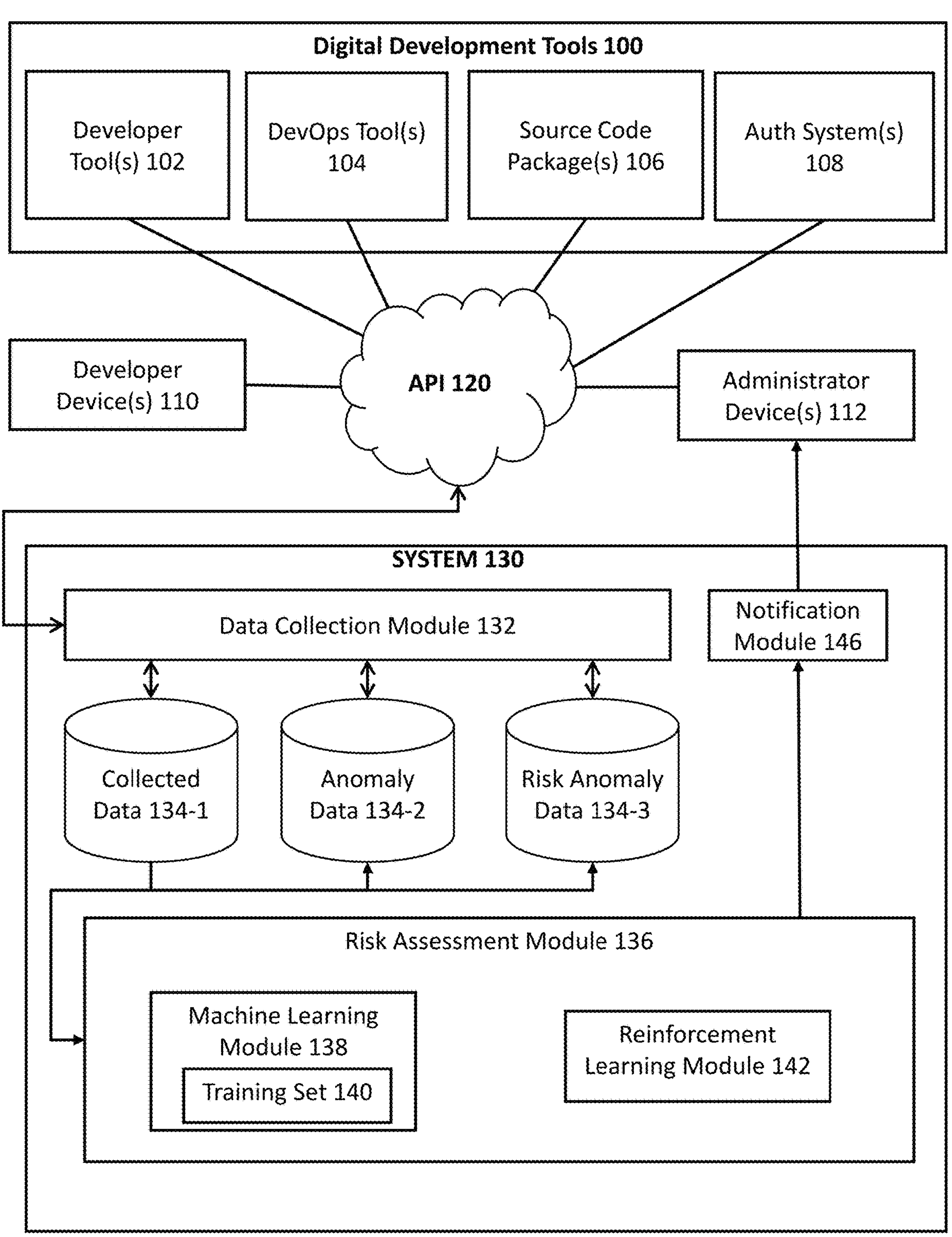
FIG. 1 depicts a system in accordance with embodiments of the present disclosure.

FIG. 1 depicts a system in accordance with embodiments of the present disclosure. In embodiments, a computer system (e.g., System 130), may comprise a risk assessment module (e.g., Risk Assessment Module 136), one or more machine learning modules (e.g., Machine Learning Module 136), one or more reinforcement learning module (e.g., Reinforcement Learning Module 142), a data collection module (e.g., Data Collection Module 132), and/or a notification module (e.g., Notification Module 146). In embodiments, the modules may be combined. In embodiments, the computer system may include one or more datastores (e.g., datastores Collected Data 134-1, Anomaly Data 134-2, and Risk-Anomaly Data 134-3), which may store, for example, collected data from users, identified anomalies, and identified risks. In embodiments, the risk assessment module may read from, and read to, the one or more datastores.

In embodiments, the computer system may use one or more application programming interfaces (e.g., API 120) to retrieve data. The API may be application specific. For example, GitHub's API may be used to retrieve data from GitHub. In embodiments, an API may be used to access data from a developer device (e.g., Developer Device(s) 110). In embodiments, the developer device (e.g., a computer or other processing device associated with a developer) may transmit data to the computer system directly without the use of an API. In embodiments, an API may be used to retrieve data directly from digital development tools (e.g., Digital Development Tools 100). Digital development tools may include developer tools (e.g., GitHub, GitLab, and Bitbucket to name a few), depicted as Developer Tool(s) 102, DevOps tools (e.g., Jenkins, CircleCI, GitHub Actions, and Azure DevOps, to name a few), depicted as DevOps Tool(s) 104, source code packages (e.g., Pandas, Numpy, PyTorch, Keras, Lodash, and Babel, to name a few), depicted as Source Code Package(s) 106 and authorization systems (OAuth.io, and The Okta Identity Cloud to name a few), depicted as auth system(s) 104. In embodiments, the developer tools may include Identity and Access Management (IAM) tools such as AzureAD and Okta. In embodiments, the developer tools may include one or more of Jira, Emails, Calendars, Docker Hub, Amazon ECR, and JFrog. In embodiments, the API may also retrieve information from any one of the developer tools 102, DevOps tools 104, Source Code Package(s) 106, auth system(s) 104, IAM tools and the one or more of Jira, Emails, Calendars, Docker Hub, Amazon ECR, and JFrog. In embodiments, data may be uploaded directly to system 130. In embodiments, an administrator device (e.g., Administrator Device(s) 112, which may include a computer or other processing device associated with an administrator) may communicate with the computer system and provide instructions regarding the steps to be taken by the computer system (e.g., concerning anomaly detection, high risk users, risk preference, notification preference, to name a few examples). In embodiments, the computer system is located in the same geographic location as the administrator device. In embodiments, the computer system is located in a separate geographic location as the administrator device.

In embodiments, the computer system may include one or more processors operatively connected to a memory device and machine-readable instructions, wherein the one or more processors execute the machine-readable instructions. The one or more processors may include suitable processing circuitry capable of controlling operations and functionality of the method steps S202-S210. For purposes of the present disclosure, a module may include its own local memory, which may store program systems, program data, and/or one or more operating systems. In embodiments, all or some of the modules may be cloud-based (e.g., the system may run on a cloud-based server). In embodiments, the computer system may be local. In embodiments, the computer system may be virtual. In embodiments, the modules may use APIs to call processes associated with other computing environments.

In embodiments, the computer system may further include a network connection interface, a central processing unit ("CPU"), a graphic processing unit ("GPU"), one or more microprocessors, a digital signal processor, or any other type of processor, or any combination thereof. In some embodiments, the functionality of the one or more processors may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each processing unit may include its own local memory, which may store program systems, program data, and/or one or more operating systems.

FIG. 2 an exemplary flowchart of embodiments of the present disclosure. In embodiments, a method may begin at step S200. As shown in FIG. 2, at step S200, the method includes obtaining, by a risk assessment module (e.g., Risk Assessment Module 136, depicted in FIG. 1), first time-series data associated with activity information of a digital identity with respect to a digital development tool. As used herein, a digital identity refers to the accounts, permissions, and other information associated with a user (e.g., a developer, an administrator, or other person involved in the digital development pipeline). A digital identity may include accounts which are shared, or which are attributed to a particular entity (e.g., a shared login used by an administrative team). A digital identity may include accounts on different services. In embodiments, the first time-series data is associated with activity information of a plurality of digital identities with respect to a digital development tool. In embodiments, the first time-series data is associated with activity information of a digital identity with respect to a plurality of digital development tools (e.g., Digital Development Tools 100 of FIG. 1, which may include Developer Tools 102, DevOps Tool(s) 104, Source Corde Package(s) 106 and Authorization System(s) 108, depicted in FIG. 1). In embodiments, the first time-series data is associated with activity information of a digital identity associated with one or more developer devices (e.g., Developer Device(s) 110, depicted in FIG. 1) The digital development tools may include tools in the software development lifecycle (e.g., Github, Jenkins, Identity Access and Management software tools, to name a few). In embodiments, the first time-series data is associated with activity information of a plurality of digital identities with respect to a plurality of digital development tools. In embodiments, the first time-series data further includes structural data associated with a state of the digital developmental tool. In embodiments, the first time-series data is obtained via a collection module (e.g., Data Collection Module 132, depicted in FIG. 1). In embodiments, the risk assessment module obtains information related to other attributes of one or more digital identities, for example, information related to relationships between digital identities, permissions, identity age, identity experience, identity role, identity security history, and the like. In embodiments, the risk assessment module obtains information related to a digital asset. For example, the risk assessment module may obtain metadata, including history of the asset and contributors. In embodiments, the risk assessment module obtains other information related to aspects of the digital development pipeline. For example, the other information may include attributes, preferences, state data, and metadata of the digital development tools, the digital identities, deployment data, and/or development data.

In embodiments, the method may continue with step S202. At step S202, the method further includes identifying, by the risk assessment module, second time-series data which is included in the first time-series data. In embodiments, the second time-series data is associated with an anomaly of the first time-series data. In embodiments, the risk assessment module is configured to store the second time-series data in memory. In embodiments, the risk assessment module identifies the second time-series data using a matrix profile calculation. In embodiments, the risk assessment module identifies the second time-series data using a density-based clustering algorithm. In embodiments, the risk assessment module identifies the second time-series data using an isolation forest algorithm. In embodiments, the risk assessment module identifies the second time-series data using a transformer algorithm. In embodiments, the transformer is an inter-attention algorithm. In embodiments, the transformer is a self-attention algorithm. In embodiments, the algorithm of the risk assessment module used to identify anomalies may be selected based on the available information received. For example, where a digital identity is new (e.g., less than one week, old, to give an example), a density-based clustering algorithm may be used. As another example, where a digital identity is old (e.g., more than week old), a transformer algorithm may be used in order to track long and short term context (e.g., picking up on cycles or patterns in behavior which might appear irregular on their own). In embodiments, the risk assessment module uses both a clustering and a transformer algorithm. In embodiments, the second time-series data is associated with at least one anomaly. An anomaly may be indicated by a set of data which is an outlier with respect to other data of the first time-series data. Anomalies may be identified based not only on comparison of the information and data associated with a single digital identity, but also with information and data associated with other digital identities. For example, in embodiments, a developer's behavior may be compared with the behavior of other developers. In embodiments, outlier behavior may be detected for any role, for example, by comparing the behavior of developers, DevOps personnel, Architect person, with other developers, DevOps personnel, Architect person, respectively. As another example, the behavior of a digital identity may be compared with the behavior of other digital entities in a given group, department and/or other structure (i.e., the entirety of) an organization. In embodiments, the second time-series data comprises a plurality of anomalies.

In embodiments, the second time-series data is stored in memory. In embodiments, the anomaly associated with the second time-series data is stored in memory. In embodiments, following identification of the anomaly, a notification may be sent to an administrator associated with the digital identity (e.g., a notification may be sent via notification module 146 to administrator device(s) 112 of an administrator associated with developer device(s) 110 of a developer, depicted in FIG. 1). In embodiments, one or more additional anomalies may be identified based on the second time-series data. The notification may include information concerning the time-series data, the associated digital identity, the associated anomaly, a first risk tag (explained in further detail below), and/or steps to remediate the anomaly, to give a few examples. In embodiments, based on the notification, an administrator may take certain steps, for example, changing security policies, removing or modifying access, quarantining a user device, and/or other actions to improve the security of the development environment. In embodiments, the notification may be based on a level of risk (e.g., whether the level of risk associated with the identified anomaly exceeds a threshold value, which may be set by an administrator).

In embodiments, anomalies may be detected based on the exemplary pseudo code provided below (labelled 'Stage 1'):

```
Stage 1: Unsupervised Time Series Analysis for Anomaly
Detection
# Stage 1: Unsupervised Time Series Analysis for Anomaly
Detection
# Step 1: Data Preparation
Load time series data
Split data into training and testing sets
# Step 2: Algorithm Selection and Hyperparameter Tuning
algorithms = [Algorithm1, Algorithm2, Algorithm3, ...]  # List
of available algorithms
best_algorithms = [ ]  # List to store the best performing
algorithms
best_scores = [ ]  # List to store the scores of the best
performing algorithms
for algorithm in algorithms:
  # Perform hyperparameter tuning for the current algorithm
  tuned_algorithm = tune_hyperparameters(algorithm,
training_data)
  # Step 3: Model Evaluation
  scores = evaluate_model(tuned_algorithm, testing_data)
  # Store the scores and algorithm
  best_algorithms.append(tuned_algorithm)
  best_scores.append(scores)
# Step 4: Algorithm Selection based on Voting Mechanism
selected_algorithms = select_best_algorithms(best_algorithms,
best_scores)
# Step 5: Anomaly Detection
anomalies = [ ]
for algorithm in selected_algorithms:
  detected_anomalies = detect_anomalies(algorithm,
time_series_data)   anomalies.append(detected_anomalies)
# Final Result
final_anomalies = perform_voting(anomalies)
# Output the final anomalies output (final_anomalies)
```

In embodiments, the method may continue with step S204. At step S204, the method further includes associating, by the risk assessment module, the second time-series data with a first risk tag based on a risk-anomaly matrix. In embodiments, the risk assessment module associates the second time-series data with a plurality of risk tags including the first risk tag. In embodiments, the first risk tag includes a value. In embodiments, the first risk tag includes a vector value. In embodiments, the risk-anomaly matrix comprises a plurality of combinations of values associated with features associated with one or more tags. In embodiments, the features comprise activity information. In embodiments, the features comprise permissions information.

In embodiments, the risk-anomaly matrix includes parameters associated with anomalies or groups of anomalies. In embodiments, the parameters of the risk anomaly matrix are based on data stored in a risk-anomaly library. In embodiments, the risk-anomaly library contains attack policies and defense policies. In embodiments, the risk-anomaly library may further contain respective scores associated with the attack policies and defense policies. In embodiments, the attack policies and defense policies may be generated by administrators and/or automatically based on incoming data, to give examples. In embodiments, the parameters may include quantifications associated with, for example, user information, user action information, tool information associated with the user action, a timestamp associated with initial access by the user or the duration of the user action, asset information associated with the asset, owner information associated with the owner of the asset, the user's IP address and device type information. In embodiments, the parameters may further include quantifications associated with, for example, time delta information associated with an amount of time from one or more activities in the sub-sequence, time deviation from mean information, frequency of event for that user information, frequency of event for that user against that asset information, frequency of access to that asset information and sub-sequence similarity to other sub-sequence information. In embodiments, the parameters may an input or selected in accordance with the expertise of security experts and/or features of the raw data required for machine learning.

In embodiments, policies, including attack policies and defense policies for a given development environment may be generated and stored in a risk-anomaly library (e.g., the Risk Anomaly Data 134-3, depicted in FIG. 1). For example, attack and defense policies may be generated by a reinforcement learning module of the risk assessment module. In reinforcement learning (RL), a policy defines the agent's behavior in an environment. Specifically, it dictates how the agent chooses actions based on its current state. A policy can be deterministic or stochastic.].

In embodiments, for a Deterministic Policy, in any given state, the agent will always select the same action. It can be represented as:

$$\alpha = pi(s)$$

Where pi is the policy, s is the state, and a is the action chosen by the agent. In embodiments, for a Stochastic Policy, in any given state, the agent selects actions based on a probability distribution. It can be represented as:

$$P(a \mid s) = pi(a \mid s)$$

Where pi(a|s) is the probability of selecting action a when in state s. The goal of many reinforcement learning algorithms is to find an optimal policy, pi*, that maximizes the expected reward over time, whether it's through value-based methods (such as Q-learning) where the policy is implicitly derived from a value function, or through policy-based methods (such as policy gradient) where the policy is directly optimized.

In embodiments, a plurality of the attack policies and defense policies are generated by the reinforcement learning module using at least one of an attacking agent and a defending agent operating in a plurality of scenarios associated with a simulated development environment. In embodiments, the reinforcement learning module uses multi-agent deep deterministic policy gradient algorithms. In embodiments, the reinforcement learning module uses a proximal policy optimization algorithm. In embodiments, the simulated development environment may be built in accordance with at least one of a generated set of individual risks, interaction between risks, and discrete values of importance assigned to risks based on the certain conditions. In embodiments, each scenario comprises a simulation of a development environment comprising: a plurality of digital identities, a plurality of digital development tools, and permissions associated with each of the digital identities and each of the digital development tools. In embodiments, each of the scenarios may be associated with a state of the environment simulating an organization using tools in the SDLC pipeline. For example, each scenario may include a number of developers (e.g., 100-1500 developers) and a number of assets (e.g., 10-300 GitHub repositories), a number of other digital development tools and associated user activity, and/or a related hierarchal access and permissions structure (e.g., the permissions of each developer). In embodiments, the number of developers, assets, and other digital development tools may be randomized. In embodiments, the environment may be generated based on real-world data. For example, the environment may be generated using a neural network or other machine learning algorithm, wherein the network or algorithm is trained using real-world data. In embodiments, the environment may be generated using a neural network or other machine learning algorithm, wherein the network or algorithm is trained using simulated data. In embodiments, the environment resembles real-life scenarios of configurations of an organization development environment and includes configurations across a spectrum of risk associated with the respective organization development environment.

Figure 3:
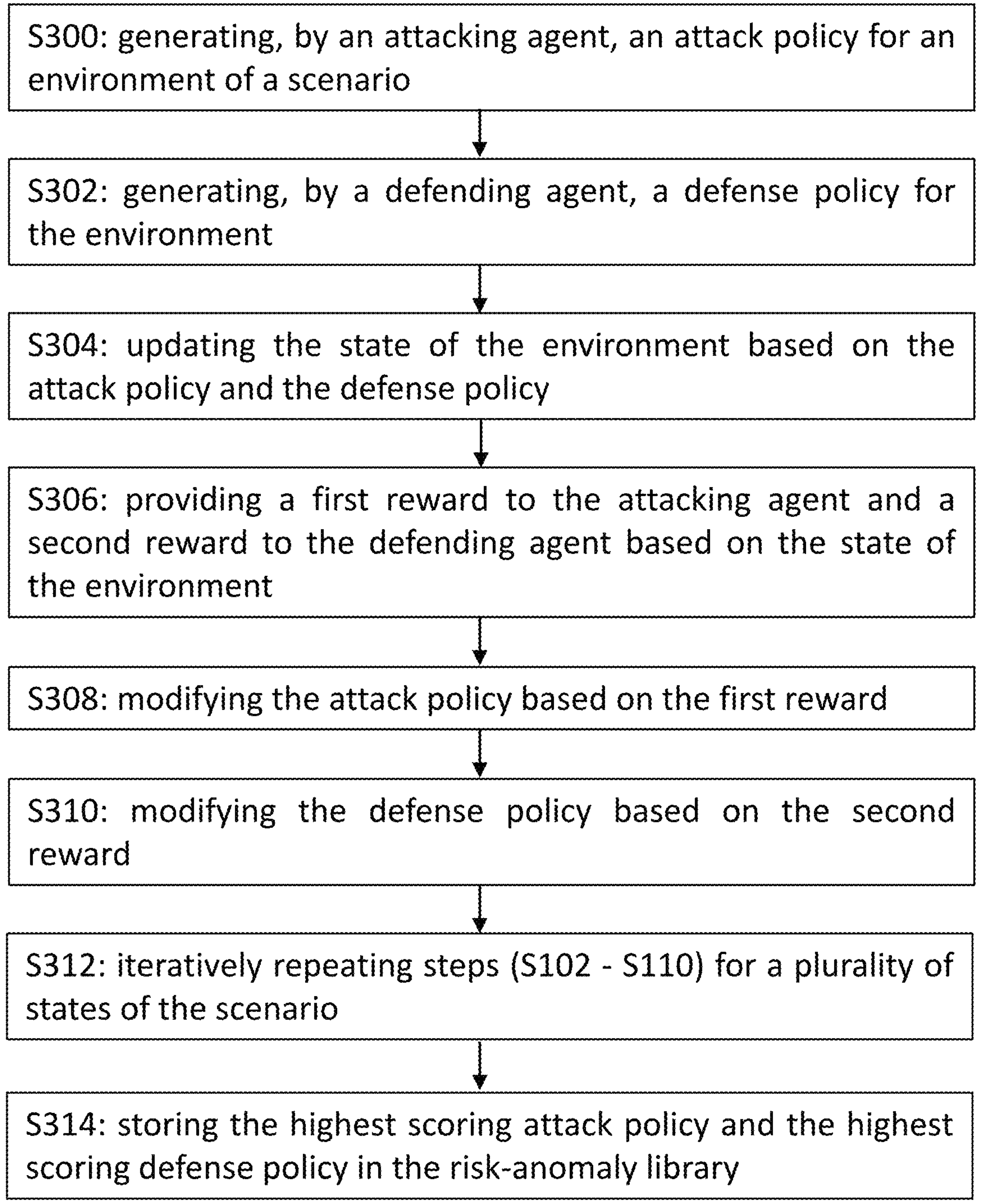
FIG. 3 depicts an exemplary flowchart of embodiments of the present disclosure.

FIG. 3 depicts an exemplary flowchart of embodiments of the present disclosure. FIG. 3 depicts a flowchart of generating attack and defense policies by a reinforcement learning module (e.g., Reinforcement Learning Module 142, depicted in FIG. 1) of the Risk Assessment Module 336 to be stored in the risk-anomaly library according to an exemplary embodiment of the present invention. At step S300, the method includes generating, by the attacking agent, an attack policy for a scenario of the simulated development environment. Attack policies include, but are not limited to: Code Tampering (where attackers attempt to introduce malicious code or backdoors into the codebase), Pipeline Poisoning (where attackers target the CI/CD pipeline to inject malicious components or behaviors into the software during its build or deployment phases), Misuse of Credentials (use of stolen developer or admin credentials to gain unauthorized access to repositories or deployment systems), Dependency Exploits (such as exploiting known vulnerabilities in external libraries or packages that the software depends on) and Configuration Exploits (such as taking advantage of misconfigured development or deployment settings, especially in cloud environments). Other examples include but are not limited to: Compromised Account Cloning (using compromised developer credentials to clone repositories, then examining the code for vulnerabilities or important data), Pipeline Monitoring (watching the CI/CD pipeline to identify which repos are directly linked to production. This knowledge can be leveraged to focus attacks on high-value targets), Codebase Tampering (introducing subtle, hard-to-detect changes to the codebase that create vulnerabilities or backdoors), Environment Hopping (using non-production environments (such as staging or testing) to find vulnerabilities or gain access to production environments), and Secrets Mining (searching repositories for accidentally committed secrets, such API keys or database credentials).

At step S302 the method further includes generating, by the defending agent, a defense policy for the scenario of the simulated development environment. Defense policies include Principle of Least Privilege (ensuring developers and operations staff have only the permissions they need, no more or no less), Code Reviews (regular and systematic code reviews to identify any malicious or unusual changes to the codebase), Automated Scanning (using tools to automatically scan codebases for vulnerabilities or secrets), Immutable Infrastructure (where infrastructure components are never modified after they are deployed. If changes are needed, new components are created and replace the old ones), and Auditing and Logging (detailed logging of all activities in the development and deployment process, ensuring any unauthorized actions can be detected and traced). For example, the generated defense policy may prevent or mitigate certain vulnerabilities in the simulated development environment (e.g., removing permissions based upon risky behavior, Right-Sizing Access (regularly review and adjust developer access to repositories to ensure they only have access to what they need), Removing Unused Access (periodically auditing and revoking access for developers or tools that no longer need it), Multi-factor Authentication (requiring MFA for all critical actions within the development and deployment processes) and Dependency Scanning (regularly scanning and updating external libraries and packages to ensure they don't contain known vulnerabilities) to give a few examples).

At step S304, the method further includes updating the state of the simulated development environment based on the attack policy and the defense policy. For example, if the attack policy included exploiting the use of source code, and there was no effective defense policy, then the simulated development environment is changed to reflect this. As another example, if the attack policy included a developer downloading code for purposes of misappropriation, and the defense policy included actions to mitigate or reduce the harm from such download (e.g., by prohibiting the download and removing permissions), the simulated development environment is changed to reflect this interaction (e.g., the developer may have been removed from the organization and/or have their permissions revoked). At step S306, the method further includes providing a first reward to the attacking agent and a second reward to the defending agent based on the state of the simulated development environment. In embodiments, the size of the first reward may depend on the degree of risk generated by the attacking agent's attack policy and the degree of success generated by the attack policy in changing the state of the simulated development environment. In embodiments, the size of the first reward may be associated with the impact of the attack policy. Similarly, in embodiments, the size of the second reward may depend on the reduction in risk associated with the defending agent's defense policy, and the degree to which the defense agent mitigated risk caused by the attacking policy, for example as reflected in the change, or lack thereof, of the state of the environment. In embodiments, the size of the second reward may be associated with a value associated with the impact of the defense policy. At step S308, the method further includes modifying the attack policy based on the first reward. At step S310, the method further includes modifying the defense policy based on the second reward. At step S312, the method may further include iteratively repeating steps S300-S310 for the plurality of states of the scenario. At step S314, the method further includes storing the highest scoring attack policy value and the highest scoring defense policy value in the risk-anomaly library. In embodiments, the method may include storing a set of high scoring attack policies values and high scoring defense policies values in the risk-anomaly library (e.g., values in the top 10%, the top 15%, the top 25%, the top 50% of policies, and policies above a threshold reward level, to name a few).

In embodiments, the reinforcement learning module may generate attack and defense policies using a method laid out in the following code (labelled 'Stage 2'):

```
Stage 2: Reinforcement Learning for Attacker-Defender
Interaction
# Stage 2: Reinforcement Learning for Attacker-Defender
Interaction
  # Step 1: Environment Setup
  scenarios = [Scenario1, Scenario2, Scenario3, ...]   #List
of available scenarios
  pretrained_algorithms = [Algorithm1, Algorithm2,
```

-continued

```
Algorithm3, ...]   # List of pretrained detection algorithms
best_attack_policies = [ ]   # List to store the best attack
policies
best_defense_policies = [ ]   # List to store the best defense
policies
   # Step 2: Attacker-Defender Interaction
   for scenario in scenarios:
   # Step 3: Environment Selection
   selected_environment = select_environment(scenario)
      # Step 4: Reinforcement Learning Setup
      attacker = Attacker( )   # Initialize the attacker agent
      defender = Defender(pretrained_algorithms)   #
Initialize the defender agent with pretrained algorithms
      best_attack_score = 0
      best_defense_score = 0
      # Step 5: Training Loop
      for episode in range(num_episodes):
         # Reset the environment for a new episode
         state = selected_environment.reset( )
         done = False
         while not done:
            # Step 6: Attacker's Action Selection
            attacker_action =
attacker.select_action(state)
            # Step 7: Defender's Action Selection
            defender_action =
defender.select_action(state)
            # Step 8: Environment Interaction
            next_state, reward, done =
selected_environment.step(attacker_action, defender_action)
            # Step 9: Update Attacker and Defender
            attacker.update(state, attacker_action,
reward, next_state)
            defender.update(state, defender_action,
reward, next_state)
            # Update the current state
            state = next_state
         # Step 10: Track Best Policies
         attack_score = evaluate_attack_policy(attacker,
selected_environment)
         defense_score = evaluate_defense_policy(defender,
selected_environment)
         if attack_score > best_attack_score:
            best_attack_policy = attacker.get_policy( )
            best_attack_score = attack_score
         if defense_score > best_defense_score:
            best_defense_policy = defender.get_policy( )
            best_defense_score = defense_score
      # Step 11: Store Best Policies
      best_attack_policies.append(best_attack_policy)
      best_defense_policies.append(best_defense_policy)
# Output the best attack and defense policies for each
scenariooutput(best_attack_policies, best_defense_policies)
```

Referring back to FIG. 2, and as shown in Tables 1 and 2, in embodiments, the method may continue with step S206. At step S206, the method further includes generating, by the risk assessment module, a first set of predicted anomalies using a machine learning module trained using a first training set. The first training set includes the second time-series data and the first risk tag. In embodiments, the machine learning module generates the first set of predicted anomalies using a Prophet model. In embodiments, the machine learning module generates the first set of predicted anomalies using a temporal fusion transformer. In embodiments, the machine learning module generates the first set of predicted anomalies using temporal convolutional networks. In embodiments, the machine learning module generates the first set of predicted anomalies using a tree-based algorithm. In embodiments, the tree-based algorithm is XGBoost. In embodiments, the tree-based algorithm is Random Forest. In embodiments, the machine learning module generates the first set of predicted anomalies using a deep neural network model.

With reference to Table 1, the first training set may include, for example, user information, user action information, tool information associated with the user action, a timestamp, asset information associated with the asset, owner information associated with the owner of the asset, the user's IP address and device type information. With reference to Table 2, the first training set also includes engineered features. Engineered features may be features of the raw data selected, for example, according to the expertise of security experts and/or features of the raw data required for machine learning. In embodiments, engineering features may include: time delta information associated with an amount of time from one or more activities in the sub-sequence, time deviation from mean information, frequency of event for that user information, frequency of event for that user against that asset information, frequency of access to that asset information and sub-sequence similarity to other sub-sequence information. In embodiments, the sub-sequence similarity to other sub-sequences may be calculated by a matrix profile algorithm.

TABLE 1

| Raw Data | |
|---|---|
| User_login | John Smith |
| Action | git.clone |
| SDLC Tool | GitHub |
| Timestamp | 2023-08-12T20:17:46.384Z |
| Asset | RepoA |
| Organization/Owner | OrgA |
| IP address | 192.158.1.38 |
| Region | US |
| Device | MacBook |

TABLE 2

| Engineered Features | | Anomaly Label |
|---|---|---|
| Time delta from other activities in the sub-sequence | 1 h 25 m 4 s | True/False |
| Time deviation from mean | 1 h 42 m 45 s | |
| Frequency of event for that user | 25% | |
| Frequency of event for that user against that asset | 25% | |
| Frequency of access to that asset | 12% | |
| Sub-sequence similarity to other sub-sequences | 0.7 | |

In embodiments, the first set of predicted anomalies may be generated using supervised machine learning, as laid out in the following code, which incorporates the outputs of Stage 1 (anomaly detection) and Stage 2 (risk-anomaly generation):

```
# Stage 3: Supervised ML for Anomaly Detection
# Step 1: Data Preparation
anomalies_stage1 = get_anomalies_stage1( )   # Get anomalies
identified in Stage 1
anomalies_stage2 = get_anomalies_stage2( )   # Get anomalies
created in Stage 2
labeled_data = [ ]   # List to store labeled sequences
independent_data = process_dataset( )   # Storing independent
variables
# Step 2: Querying Data for Patterns
for anomaly in anomalies_stage1:
         pattern = query_data_for_pattern(anomaly)   # Query the
data for the pattern
      labeled_data.append((pattern, 1))   # Mark the pattern as
malicious
for anomaly in anomalies_stage2:
```

-continued

```
    pattern = query_data_for_pattern(anomaly)  # Query the
data for the pattern
    labeled_data.append((pattern, 1))  # Mark the pattern as
malicious
    independent_data.append(anomaly)  # Append the anomaly as
independent variable
# Step 3: Train-Test Split
train_data, test_data =
split_train_test_data(independent_data, labeled_data,
test_ratio)
# Step 4: Hyperparameter Tuning and Model Training
algorithms = [Algorithm1, Algorithm2, Algorithm3, ...]  # List
of available algorithms
best_algorithm = None  # Variable to store the best performing
algorithm
best_accuracy = 0  # Variable to store the highest prediction
accuracy
for algorithm in algorithms:
    best_accuracy_for_algorithm = 0  # Variable to store the
best accuracy for the current algorithm
    best_hyperparameters = None  # Variable to store the best
hyperparameters for the current algorithm33
    for hyperparameters in hyperparameter_configs:
        # Train the model using the current hyperparameter
configuration
        model = train_model(algorithm, train_data,
hyperparameters)
    # Step 5: Model Evaluation
    accuracy = evaluate_model(model, test_data)
    # Check if the current hyperparameter configuration has
higher accuracy
        if accuracy > best_accuracy_for_algorithm:
            best_accuracy_for_algorithm = accuracy
            best_hyperparameters = hyperparameters
    # Check if the current algorithm has higher accuracy than
the previous best algorithm
    if best_accuracy_for_algorithm > best_accuracy:
        best_algorithm = algorithm
        best_accuracy = best_accuracy_for_algorithm
# Step 6: Stream in New Data and Make Predictions
streamed_data = stream_new_data( )  # Get the streamed data
predictions = [ ]
for data in streamed_data:
    prediction = best_algorithm.predict(data)  # Make
prediction using the best algorithm
    predictions.append(prediction)
# Step 7: Save Predictions to Output
save_predictions(predictions, output_file)  # Save the
predictions to the output file
# Output the best algorithm and its accuracy
output(best_algorithm, best_accuracy)
```

In embodiments, the method may continue with step S208. At step S208, the method further includes associating, by the risk assessment module, the first set of predicted anomalies with a second risk tag based on the risk-anomaly matrix. In embodiments, the second risk tag includes a value. In embodiments, the second risk tag includes a vector of values. In embodiments, the risk assessment module associates the second time-series data with a plurality of risk tags including the second risk tag. For example, the second time-series data may include a plurality of predicted anomalies, one or more of which may be associated with one or more respective risk tag.

In embodiments, the first set of predicted anomalies may be further associated with other data and/or information. For example, the first predicted anomaly may be associated with a third risk tag, a risk severity tag, and/or information concerning possible steps to prevent the predicted anomaly from harming an organization (e.g., possible steps an administrator may take, such as those generated by the defending agent).

In embodiments, the method may continue with step S210. At step S210, the method further includes transmitting, by the risk assessment module, a notification associated with at least one of (i) the anomaly and (ii) the predicted anomaly, and the digital identity. In embodiments, the notification is transmitted to a system administrator. In embodiments, the notification comprises a mitigation recommendation. The notification may include information concerning the time-series data, the associated digital identity, the associated anomaly, the predicted anomaly, the first risk tag, the second risk tag, steps to remediate the associated anomaly, and/or steps to remediate the predicted anomaly, to give a few examples. In embodiments, based on the notification, the system administrator may take certain steps, for example, changing security policies, removing or modifying access, quarantining a user device, and/or other actions to improve the security of the development environment. In embodiments, the notification may be based on the level of risk (e.g., whether a level of risk associated with the predicted anomaly exceeds a threshold value, which may be set by a system administrator).

It is to be understood that the first time-series data and second-time series data is exemplary and is not intended to be limiting. Therefore, in some embodiments, the first time-series data and second-time series data is first data and second data generally. First data and second data may be data associated with the user and the software development pipeline (e.g., user configuration data, hierarchical data, permissions data, developer data, such as length of employment and role, In further exemplary embodiments, a method for identifying behavioral anomalies and risk factors includes obtaining, by a risk assessment module, first data associated with activity information of a digital identity with respect to a digital development tool, associating, by the risk assessment module, the second data with a first risk tag based on a risk-anomaly matrix, generating, by the risk assessment module, a first predicted anomaly using a machine learning module trained using a first training set, wherein the first training set comprises the second data and the first risk tag, associating, by the risk assessment module, the first predicted anomaly with a second risk tag based on the risk-anomaly matrix, and, transmitting, by the risk assessment module, a notification associated with at least one of the anomaly and the predicted anomaly, and the digital identity. In embodiments, the first data and the second data are time-series data.

An advantage of the system and methods described herein is that the disclosed systems and methods enable the system to prevent and mitigate anomalies which may otherwise be seemingly innocent events when viewed in isolation. For example, a new developer might request access to an ordinary number of repositories, analyze which repositories are deployed and build dependency graphs for repositories in a production pipeline, analyze the packages in each dependency graph for security vulnerabilities, change the version of a given package in the manifest file to a vulnerable version that can be exploited, and subsequently check in the new manifest file. Once built, the new developer may offer the information for sale (e.g., the application with an exploitable package) to a third party (e.g., a hacker) willing to exploit it. In isolation, each of these events may be attributable to innocence, incompetence, or even great care. For example, analyzing for security vulnerabilities is not a suspicious behavior. While not ideal, adding a security risk is often an innocent action performed by even season developers. If these events (before the offer for sale of information) are viewed in isolation, then it would be difficult, if not impossible, to determine the likelihood of the presence of a security risk. Even once detected, it would be difficult to determine that a given actor is responsible. The present disclosure, as opposed to the prior art, allows for the detection of anomalies, even across the multiple actions, taking into consideration the status of the developer, the proximity of the events, and other relevant factors. Moreover, the present disclosure allows for predicting anomalous behavior in advance, for example, even before the developer inserts unsecure code. Finally, the present disclosure allows for providing timely notifications and remediation/prevention recommendations, for example, by changing configurations, requiring additional authentication before certain steps are performed, quarantining digital identifies or assets as part of a holistic end-to-end analytics-to-remediation process.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method identifying behavioral anomalies and risk factors comprising:

(A) obtaining, by a risk assessment module, first time-series data associated with activity information of a digital identity with respect to a digital development tool;

(B) identifying, by the risk assessment module, second time-series data included in the first time-series data, wherein the second time-series data is associated with an anomaly of the first time-series data;

(C) associating, by the risk assessment module, the second time-series data with a first risk tag based on a risk-anomaly matrix, wherein the risk-anomaly matrix is generated based on attack policies and defense policies stored in a risk-anomaly library, wherein a plurality of the attack policies and defense policies are generated by a reinforcement learning module comprising an attacking agent and a defending agent by the steps comprising, for each scenario of a plurality of scenarios:

(i) generating, by the attacking agent, an attack policy for an environment of the scenario;

(ii) generating, by the defending agent, a defense policy for the environment;

(iii) updating the state of the environment based on the attack policy and the defense policy;

(iv) providing a first reward to the attacking agent and a second reward to the defending agent based on the state of the environment;

(v) modifying the attack policy based on the first reward;

(vi) modifying the defense policy based on the second reward;

(vii) iteratively repeating steps (i) through (vi) for a plurality of states of the scenario; and (viii) storing a highest scoring attack policy and a highest scoring defense policy in the risk-anomaly library, wherein an attack policy score is determined by evaluating the attack policy and the environment and a defense policy score is determined by evaluating the defense policy and the environment;

(D) generating, by the risk assessment module, a first predicted anomaly based on the second time-series data and the first risk tag, using a machine learning module trained using a first training set, wherein the first training set comprises the second time-series data and the first risk tag;

(E) associating, by the risk assessment module, the first predicted anomaly with a second risk tag based on the risk-anomaly matrix; and (F) transmitting, by the risk assessment module, a notification associated with at least one of (i) the anomaly, (ii) the predicted anomaly, or (iii) the digital identity.

2. The method of claim 1, wherein the reinforcement learning module comprises at least one of a multi-agent actor-critic algorithm or a proximal policy optimization algorithm.

3. The method of claim 1, wherein the environment is based on a generated set of individual risks, interactions between risks, and importance of risk.

4. The method of claim 1, wherein each scenario comprises a simulation of a development environment comprising:

(i) a plurality of digital identities, (ii) a plurality of digital development tools; and (iii) permissions associated with each of the digital identities and each of the digital development tools.

5. The method of claim 1, wherein the reinforcement learning module comprises multi-agent deep deterministic policy gradient algorithms.

* * * * *